June 16, 1942.  E. J. GORN  2,286,212
ARC WELDING DEVICE
Filed March 15, 1941
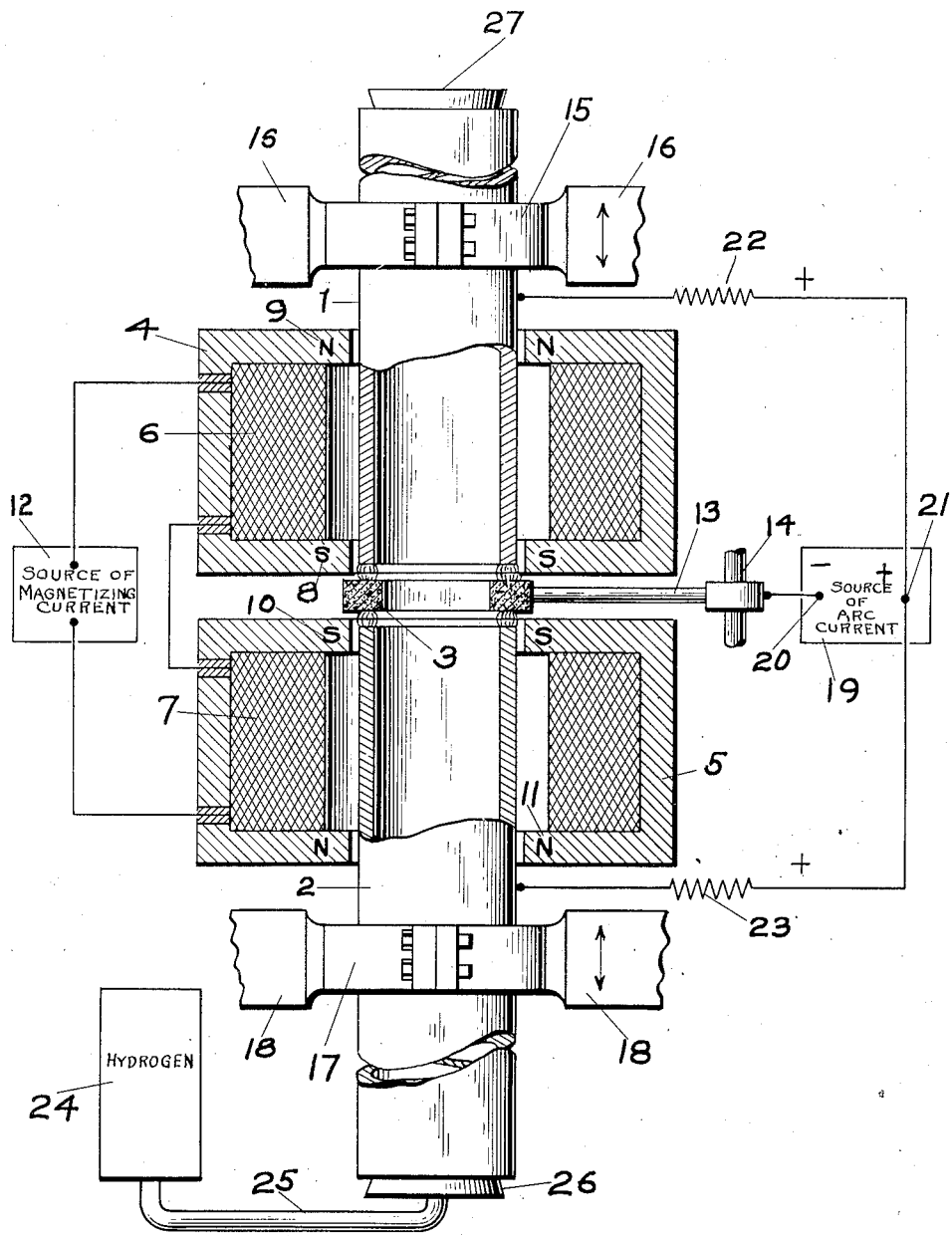
INVENTOR.
Elmer J. Gorn Patented June 16, 1942

2,286,212

UNITED STATES PATENT OFFICE 2,286,212

ARC WELDING DEVICE

Elmer J. Gorn, Brookline, Mass., assignor to Raytheon Manufacturing Company, Newton, Mass., a corporation of Delaware Application March 15, 1941, Serial No. 383,598

8 Claims. (Cl. 219—4)

This invention relates to an arc welding device, particularly as applied to the invention as described and claimed in the copending application of Laurence K. Marshall and John W. Dawson, on Arc welding system and method, Serial No. 360,796, filed October 11, 1940. In said application there is described and claimed a system in which an arc is dispersed by means of magnetic fields over relatively extended areas of two members to be welded, whereby said surfaces are heated and then moved into welding engagement with each other.

In an arrangement of this kind the conditions at one polarity of the arc are often more suitable for optimum welding conditions than at the opposite polarity.

An object of this invention is to cause the same arc polarity to exist at each of the surfaces to be welded in order that the conditions at each welding surface be more nearly alike as well as to select the more advantageous polarity.

A further object of this invention is to produce a separate arc at each welding surface so that the conditions at said surface may be adapted for optimum operation.

A still further object is to utilize a simple refractory electrode from which each of the dispersible arcs are maintained to the two surfaces to be welded.

The foregoing and other objects of this invention will be best understood from the following description of an exemplification thereof, reference being had to the accompanying drawing wherein the figure is a cross-sectional view of a device embodying my invention, together with a diagrammatic circuit which may be used therein.

In the drawing two metal bodies 1 and 2, which are shown in the form of tubes or pipes, are to be welded to each other along their adjacent edges so as to form a continuous tube or pipe. The pipes 1 and 2 are held spaced apart so as to provide an annular gap in which a suitable refractory electrode 3 is located. This electrode may be made of refractory carbon or some other suitable refractory conducting material. Surrounding the pipes 1 and 2 respectively are two magnetic shells 4 and 5. These magnetic shells are provided with aligned openings through which the pipes 1 and 2 are inserted. The edges of the openings in the shell 4 constitute pole pieces 8 and 9 while the edges of the openings in the shell 5 constitute pole pieces 10 and 11. In order to energize the pole pieces, annular coils 6 and 7 are placed respectively in the outer annular spaced provided in the magnetic shells 4 and 5.

In order to energize the coils 6 and 7, said coils are connected in series with a source of magnetizing current 12. Although this may be a source of direct current, any other suitable type of current supply may be chosen. The energization of the coils 6 and 7 create radial fields at the pole pieces 8 and 10, respectively, which produce a transverse component of magnetic field in each of the arc gaps existing between the faces of the electrode 3 and the adjacent ends of the pipes 1 and 2, respectively.

The electrode 3 is adapted to be moved selectively into position adjacent the ends of the pipes 1 and 2 for the purpose of establishing an arc to each of said pipes and out of said position so that the pipes may be moved into welding engagement with each other. For this purpose the electrode 3 is mounted on a conducting arm 13 which in turn is carried by a rotatable shaft 14. The axis of rotation of the shaft 14 is substantially at right angles to the plane of the end surfaces of the pipes 1 and 2 to be welded, so that upon rotation of said shaft, the electrode 3 is readily moved out of its arc-maintaining position. Any suitable actuating means are provided for the shaft 14. Preferably this means is such that when the surfaces to be welded are sufficiently heated, the electrode 3 is rapidly moved out of its arc-maintaining position.

The pipe 1 is supported by a clamping ring 15 mounted upon base members 16. The base members 16 are adapted to be moved in either direction along the axis of the pipe 1. Likewise the pipe 2 is held in position by means of a clamping ring 17 mounted upon base members 18. Base members 18 likewise are adapted to be moved in either direction along the axis of the pipe 2. The motion of the base members 16 and 18 may be automatically coordinated with that of the shaft 14 so as to perform the various operations at the desired times and in the desired sequence.

In order to establish and maintain an arc to the ends of the pipes 1 and 2, a source of arc current 19 is provided. This source may supply current of any suitable nature which may be in the form of direct current or alternating current, or any specialized form, particularly adapted for the purpose for which it is to be used. In the present arrangement, however, I prefer to have the source 19 supply direct current. One terminal 20 of the source 19 is connected directly to the conducting arm 13 and thus to the refractory electrode 3. This terminal may, for example, be the negative terminal of the source. The other terminal 21 of said source is provided with two connections, one of which extends through a current-limiting and controlling impedance 22 to the pipe 1, the other of which extends through a current-limiting and controlling impedance 23 to the pipe 2. The impedances 22 and 23 may be either resistances or inductances.

In some instances it may be desired to carry out the heating of the welding surfaces in a non-oxidizing atmosphere. For this purpose a non-oxidizing gas, such as hydrogen, may be supplied from source 24. This source 24 may be connected through a pipe 25 which extends through a gas-tight plug 26 in the lower end of the pipe 2, and supplies gas to the interior of said pipe 2. The upper end of the pipe 1 may likewise be closed by a gas-tight plug 27. Under these conditions the hydrogen will flow into the pipe 2 and out through the annular gaps provided between the electrode 3 and the adjacent ends of the pipes 1 and 2. In order that the gas may flow freely to both of these gaps, the electrode 3 is preferably made in annular form so as to provide an opennig in the center thereof.

When the sources 12 and 21 are energized, an arc is struck between the electrode 3 and the adjacent ends of the pipes 1 and 2 by any suitable means. One way of accomplishing the initiation of the arcs is to momentarily move the pipes 1 and 2 into engagement with the electrode 3. Once the arcs are established in the annular arc gaps, they will be subjected to the radial component of the magnetic field, and each arc therefore will spin rapidly around the ends of the pipes 1 and 2, causing the dispersion and uniform heating of these pipe ends as more fully described in said Marshall and Dawson application. When the end surfaces of the pipes 1 and 2 have been raised to the proper welding temperature, the rotatable shaft 14 is actuated, rapidly moving the electrode 3 out of position between the pipes 1 and 2. Thereupon the base members 16 and 18 are moved toward each other, bringing the ends of the pipes 1 and 2 into welding engagement with each other, thus producing the desired union of these two pipe members.

In the arrangement as described above, it will be seen that each surface to be welded is subjected to an arc of the same polarity. Therefore the conditions at these two welding surfaces can be maintained to secure optimum welding conditions. In some cases it may be desirable to create different conditions at the two surfaces to be welded. For example, in some cases the size of the material of the two pipes may be different. The present arrangement permits an independent control of the welding conditions at each of the surfaces as, for example, by properly selecting the size and nature of the current-limiting and controlling impedances 22 and 23.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. A machine for welding together two annular members along their end walls having, in combination, an electrode, means for holding said electrode adjacent the end walls of said members and separated from each of said end walls by a gap, means for striking an arc between said electrode and each of said end walls and for maintaining said arcs while said electrode and walls are held separated, means for moving each of said arcs rapidly along and throughout the peripheral extent of the end walls to heat the end walls rapidly throughout their peripheral extent, and means for applying pressure to the heated end walls to cause the heated end walls to become welded to each other.

2. A system for operating on two members each having faces connected along the thickness dimensions of the members by an end wall to heat process the members along and throughout a predetermined extended length of the end walls, the system having, in combination, an electrode, means for holding said electrode adjacent said end walls but non-contacting throughout said predetermined extended length, means for striking an arc between said electrode and each of said adjacently disposed end walls with the terminals of the arcs engaging the electrode and the respective end walls, and means operable while the electrode and walls are non-contacting and while the terminals of the arcs are maintained in engagement with said electrode and the respective end walls for moving the arc along and throughout the predetermined extended length, with sufficient rapidity and a sufficient number of times to heat the end walls substantially uniformly throughout the predetermined extended length.

3. A machine for welding together two members each provided with a wall having, in combination, an electrode, means for holding said electrode so that it is disposed adjacent the walls throughout a predetermined extended length but with the electrode separated from each of the walls at all points of the predetermined extended length by a gap, means for impressing opposite potentials between the electrode and the members to produce an arc in each gap while the electrode is held separated from the walls, means operable while the electrode and walls are held separated from each other for moving the arcs in the gaps along and throughout the predetermined extended length, with sufficient rapidity and a sufficient number of times to heat the walls substantially uniformly throughout the predetermined extended length, and means for pressing the members relatively toward each other to bring the heated walls into tight engagement, thereby to cause the members to become welded to each other along the heated walls.

4. A machine for welding together two members each provided with a wall having, in combination, an electrode, means for holding said electrode so that it is disposed adjacent the walls throughout a predetermined extended length but with the electrode separated from each of the walls at all points of the predetermined extended length by a gap, means for impressing opposite potentials between the electrode and the members to produce an arc in each gap while the electrode is held separated from the walls, means operable while the walls are held separated from each other for establishing in each gap a magnetic field having a substantial component at right angles to the length dimension of the gap to cause the arc to travel in the gap along and throughout the predetermined extended length, with sufficient rapidity and a sufficient number of times to heat the walls substantially uniformly throughout the predetermined extended length, and means for pressing the members relatively toward each other to bring the heated walls into tight engagement, thereby to cause the members to become welded to each other.

5. A machine for heat-processing two members each provided with a wall having, in combination, an electrode, means for holding said electrode so that it is disposed adjacent the walls throughout a predetermined extended length but with the electrode separater from each of the walls at all points of the predetermined extended length by a gap, means for impressing opposite potentials between the electrode and the members to produce an arc in each gap while the electrode is held separated from the walls, means operable while the electrode and walls are held separated from each other for establishing in the gap a magnetic field having a substantial component at right angles to the length dimension of the gap to cause the arc to travel in the gap along and throughout the predetermined extended length, with sufficient rapidity and a sufficient number of times to heat the walls substantially throughout the predetermined extended length.

6. A machine for heat-processing two members each provided with a wall having, in combination, a refractory electrode, means for holding said electrode so that it is disposed adjacent the walls throughout a predetermined extended length but with the electrode separated from each of the walls at all points of the predetermined extended length by a gap, means for impressing opposite potentials between the electrode and the members to produce an arc in each gap while the electrode is held separated from the walls, means operable while the electrode and walls are held separated from each other for establishing in the gap a magnetic field having a substantial component at right angles to the length dimension of the gap to cause the arc to travel in the gap along and throughout the predetermined extended length, with sufficient rapidity and a sufficient number of times to heat the walls substantially throughout the predetermined extended length.

7. A machine for heat-processing two members each provided with a wall having, in combination, a refractory carbon electrode, means for holding said electrode so that it is disposed adjacent the walls throughout a predetermined extended length but with the electrode separated from each of the walls at all points of the predetermined extended length by a gap, means for impressing opposite potentials between the electrode and the members to produce an arc in each gap while the electrode is held separated from the walls, means operable while the electrode and walls are held separated from each other for establishing in the gap a magnetic field having a substantial component at right angles to the length dimension of the gap to cause the arc to travel in the gap along and throughout the predetermined extended length, with sufficient rapidity and a sufficient number of times to heat the walls substantially throughout the predetermined extended length.

8. A machine for heat-processing two members each provided with a wall having, in combination, an electrode, means for holding said electrode so that it is disposed adjacent the walls throughout a predetermined extended length but with the electrode separated from each of the walls at all points of the predetermined extended length by a gap, means for impressing opposite potentials between the electrode and the members to produce an arc in each gap while the electrode is held separated from the walls, means operable while the electrode and walls are held separated from each other for establishing in the gap a magnetic field having a substantial component at right angles to the length dimension of the gap to cause the arc to travel in the gap along and throughout the predetermined extended length, with sufficient rapidity and a sufficient number of times to heat the walls substantially throughout the predetermined extended length, said electrode being movable into and out of arc-sustaining position with respect to said walls.

ELMER J. GORN.